United States Patent Office 3,391,892
Patented July 9, 1968

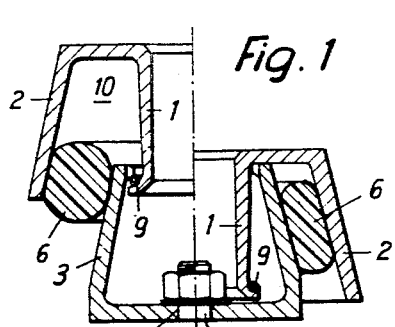
Fig. 1
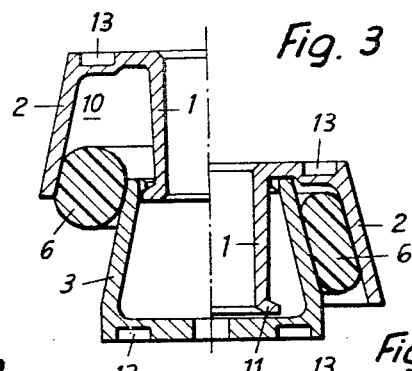
Fig. 3
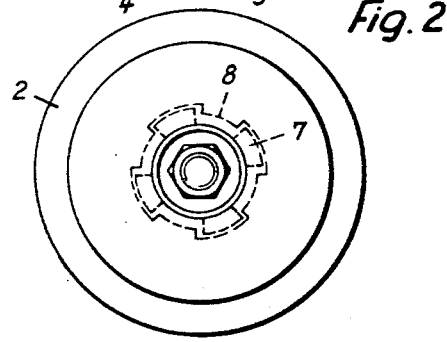
Fig. 2
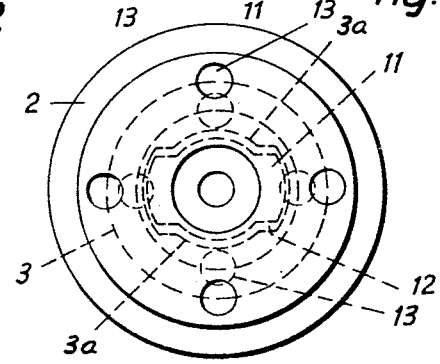
Fig. 4
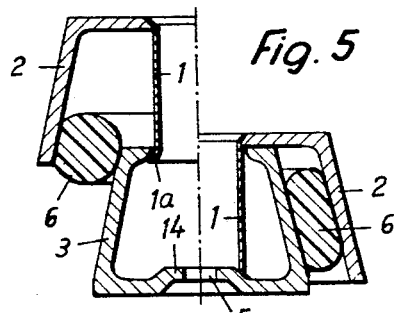
Fig. 5
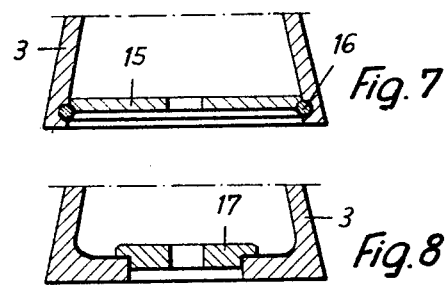
Fig. 7
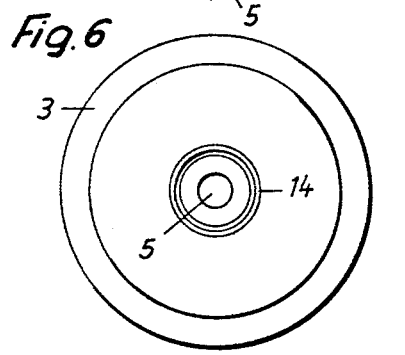
Fig. 6
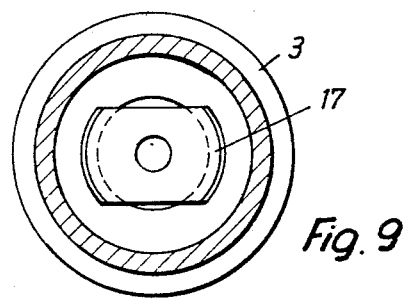
Fig. 8
Fig. 9

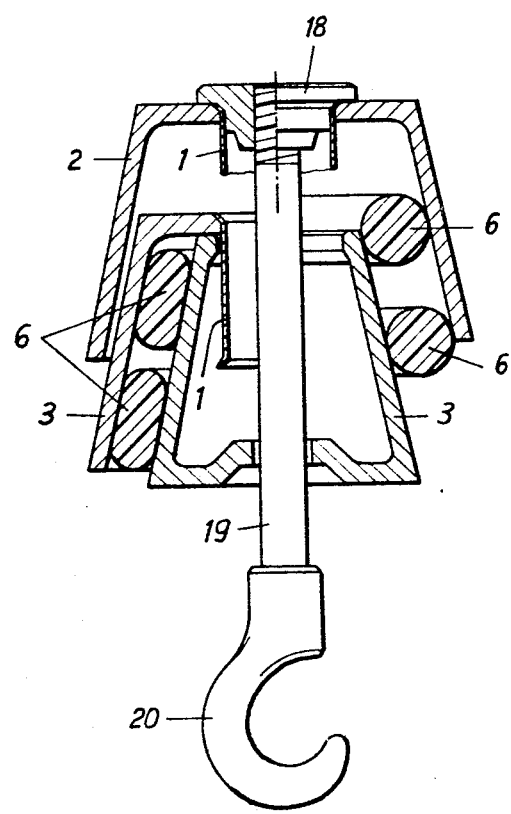

3,391,892
RESILIENT SUPPORTING DEVICE
Hermann J. Neidhart, Geneva-Bernex, and Rico Neidhart, Geneva, Switzerland, assignors to Neidhart S.A., Geneva-Bernex, Switzerland
Filed May 9, 1966, Ser. No. 548,722
4 Claims. (Cl. 248—358)

ABSTRACT OF THE DISCLOSURE

A resilient supporting device in which a resilient endless ring is confined under precompression between substantially parallel circumferential frusto-conical surfaces on two components which are movable axially in relation to each other and prevented from separation by coacting engagement means on one of the components and on a tubular extension in the other which projects into said one component.

---

The invention relates to a resilient supporting device of the kind having a frusto-conical and a bell-shaped component separated by at least one ring of rubber or rubber-like material permitting relative movement between the two components.

The known devices of this type have considerable disadvantages. For example, the rubber bodies are exposed to contamination and destruction at points where the rubber forms inaccessible pockets in which oil, washing petrol, cleaning agent, contaminated with dust and dirt may accumulate which act as lubricating agents and make the rubber slip or swell, and which destroy the same. In other supporting devices the bell-shaped frusto-conical components are not held together so that the position of the elastic body is not secured. Supporting devices which do not hold their components together can, moreover, be used only for permanent loads and then only for those with a vertical resilient movement. They are not suitable for horizontal position or for over-head applications, nor are they suitable for vehicles or moving mechanisms because of the danger of the load being lifted off. When the components are held together in the conventional manner by means of a central bolt a corresponding flange with several attachment holes is necessary for the attachment on the bottom, for which purpose the base is often not sufficient. Moreover, these supporting devices lack as a rule the possibility of pre-loading and are accordingly voluminous.

The invention aims at providing a supporting device which is free from these disadvantages.

In a resilient supporting device according to the invention a frusto-conical component engages within a bell-shaped component but is separated therefrom by one or more rings of a rubber or rubber-like material whereby relative movement of one component to the other is permitted. The bell-shaped component has means engaging a corresponding part in the frusto-conical component whereby the two parts cannot accidentally become disengaged.

Preferably the bell-shaped part has at least one internally directed tubular extension. This tubular extension is preferably arranged coaxially to the frusto-conical and to the bell-shaped components. The tubular extension may have means by which the bell-shaped component is detachably connected with the frusto-conical component, without affecting the movement of these two components relative to one another as caused by changes in the loading.

In the accompanying drawings several embodiments of the invention are illustrated, by way of example. In the drawings:

FIG. 1 is an axial section of a first embodiment of a supporting device according to the invention, the left-hand side of the figure showing the device in the unloaded position, and the right-hand side in the position of axial loading.

FIG. 2 is a plan view of the device according to FIG. 1.

FIG. 3 and FIG. 4 are a longitudinal section and a plan view respectively of a second embodiment of a supporting device according to the invention.

FIG. 5 and FIG. 6 are a longitudinal section and a plan view respectively of a third embodiment of a supporting device according to the invention.

FIG. 7 and FIG. 8 are longitudinal part sections through the bottom portions of two frusto-conical bodies.

FIG. 9 is a sectional plan view of the body according to FIG. 8, and

FIG. 10 is a longitudinal section of an embodiment of the supporting device for tensile loads, wherein the bell-shaped portion is shown in the unloaded position, and in the maximum position on the left-hand side of this figure also.

In the supporting device according to FIGS. 1 and 2 the bell-shaped portion 2 has a tubular extension 1 which is integral with the component 2. The tubular extension 1 projects with its free end into the frusto-conical part 3 which in the middle of its bottom has an aperture 4 from which an attachment screw 5 extends. Between the components 2 and 3 there lies the elastic ring 6 of rubber or a similar rubber-elastic material. When an axial force acts on the components 2 and 3 the ring 6 rolls on the outer circumference of the part 3 and on the inner circumference of the part 2, being at the same time deformed. The free end of the tube 1 is flanged outwardly and has four lugs 7 which upon relative rotation of components 2 and 3 through 45° engage below corresponding lugs 8 formed at the upper edge of the component 3. A cricular clip 9 which is mounted on the tubular portion 1 prevents a pulling apart of the components 2 and 3 beyond the position illustrated on the left-hand side of FIG. 1. Different lengths of the tubular extension 1 may be chosen. In this manner it is possible to pre-load the device within the limits of the position in which the components 2 and 3 are remotest from one another and the position in which they almost contact one another, and thereby to influence the spring characteristic. The ring 6 fulfills apart from its task as an elastic rolling carrier element two further functions, namely the function of centering the components 2 and 3 and in conjunction with the tubular extension 1 the task of screening the interstice between these two components thereby that both together prevent foreign bodies and dirt from penetrating into the interior 10 of the bell-shaped component 2.

The embodiment according to the FIGS. 3 and 4 differs from that according to the FIGS. 1 and 2 mainly thereby that the connection of the bell-shaped part 2 with the frusto-conical part 3 is effected without an additional circular clip. The tubular extension 1 has two lugs 11 projecting outwardly and the part 3 has corresponding recesses 12 at its upper edge. The component 2 is inserted into the component 3 in the position illustrated in FIG. 4. After forcing the two parts into one another the same are turned with respect to one another 90° and locked thereby that the lugs 11 engage below the edge portions 3a of the part 3. The high frictional resistance which the ring 6 offers to the turning of the two components 2 and 3 relative to one another offers a great safety against any unintentional disengagement of these components in as much as this resistance increases with increasing loading of the supporting device.

In order to facilitate the turning of the components 2 and 3 relative to one another when assembly or dismantling the device, recesses 13 may be provided in the bottoms of these components which are designed for the insertion of suitable tools.

As shown in the embodiment according to FIGS. 5 and 6, the tubular extension 1 may be, if desired, constructed as a part separate from the bell-shaped component 2. It may be fitted from outside or from inside to the bottom of the bell-shaped component 2 and attached to the latter in any manner desired, e.g. by burring-over or it may be screwed in. For the purpose of burring-over a tool is to be introduced from above or through a suitably large opening in the bottom of the parts 3 from below. The bottom of the part 3 is, however, preferably constructed, as illustrated in FIG. 5, with an internally projecting conical projection 14 which may serve for the burring-over. The tube 1 receives this internal burring by pressing the components 2 and 3 into one another until the burr 1a of the tube 1 has been formed on the conical portion 14 of the bottom. Since the opening 5 in the bottom of the component 3 would be too large for an attachment bolt in case of its use for the introduction of a tool for the burring, it is advisable to insert a separate bottom 15 by means of a spring slip 16 according to FIG. 7 or a bridging plate 17 according to FIGS. 8 and 9.

The supporting devices described may, as such, only take compressive forces resiliently. By suitable additional measures, however, the devices may also be constructed in such a manner that they take tensile forces resiliently. FIG. 10 shows, for example, an embodiment of a device according to FIG. 5, having however two rubber rings 6, and in which the bottom of the component 2 an insert 18, constructed as a nut, is inserted into which a tension rod 19 with a tension hook 20 is screwed from below.

The opening of the tube 1 may, if desired, be provided with additional components other than a tension rod, for example, it may be arranged to take in a cylindrical, conical or screw threaded additional component as the connecting member with the article to be supported, for example, a machine, a motor or the like, or when used as a buffer it may be provided with a plate, or for spatial movements with a spherical body.

The components 2 and 3 need not be of a circular cross sectional profile but may have, e.g., an oval shape. The ring 6 even if originially round normally adapts itself to deviation in shape.

For large supporting devices more than one tubular projection 1 may be provided.

The embodiments described are normally suitable for being attached in the simplest possible manner and to secure the rings 6; but as already mentioned, also for pre-loading the same. Particularly when the device is used for the support of a machine, it would be nonsensical and wasteful to use more material than required in order to let it operate within the amplitudes of the oscillations. The pre-loading reduces the height or allows, as in all the other cases, the arrangement of several rings one above another e.g. greater weights per support are to be taken, e.g. as according to FIG. 10.

On the other hand when used as a buffer, i.e. when there is only a short period of loading, jerking, jolting rather a larger spring path is desirable and moreover a soft response, so that in such cases the pre-loading is carried only so far as required for holding the device together and for fixing the ring or rings.

What we claim is:
1. In a resilient supporting device, a bell-shaped first component having an inner circumferential surface of frusto-conical shape, a second component having an outer circumferetial surface of frusto-conical shape of substantially the same conicity as said inner circumferential surface of the first component, a wall covering the smaller end of said first component and having a central opening therein, a tubular extension extending inwardly from the edge of said opening and through the open smaller end of the second component, coacting engagement means at the inner end of said tubular extension and said open smaller end of said second component preventing separation of said first and second components at least in one relative angular position of said components and to be freely releasable from inter-engagement by movement of said tubular extension inwardly from said separation-preventing position, and at least one endless resilient ring in precompressed condition in engagement with said circumferential frusto-conical surfaces on the first and second components, whereby relative movement of said first and second components in the direction causing deeper penetration of said tubular extension into said second component increases the compression of said resilient ring while relative movement in the opposite direction decreases said compression.

2. The supporting device set forth in claim 1, including a cover means at the large end of said second component.

3. The supporting device set forth in claim 2, in which said cover means is provided with an opening for a fastening means, thereby making said fastening means accessible by means of a tool entered through said tubular extension.

4. The supporting device set forth in claim 1, in which said coacting engagement means comprise outwardly projecting lugs on said tubular extension and a flange on said second component which projects inwardly and has recesses allowing passage of said lugs therethrough, whereby assembly of the supporting device is achievable by placing said resilient ring in the annular space between the adjacent circumferential end portions of said first and second components, passing said lugs through said recesses to slightly compress said resilient ring, and rotating said first and second components relative to each other until said lugs engage the inner side of said flange in the areas between said recesses.

References Cited

UNITED STATES PATENTS

| | | | |
|---|---|---|---|
| 2,147,660 | 2/1939 | Loewus. | |
| 2,179,959 | 11/1939 | Schroedter. | |
| 2,353,944 | 7/1944 | Storch | 248—358 |
| 2,766,163 | 10/1956 | Schwartz et al. | 248—358 XR |
| 2,819,060 | 1/1958 | Neidhart | 248—22 XR |
| 2,927,786 | 3/1960 | Templeton | 287—85 XR |
| 3,060,538 | 10/1962 | Simi | 248—22 XR |

FOREIGN PATENTS

| | | |
|---|---|---|
| 829,524 | 4/1938 | France. |
| 405,017 | 7/1966 | Switzerland. |

ROY D. FRAZIER, *Primary Examiner.*

R. P. SEITTER, *Assistant Examiner.*